United States Patent [19]

Dührkoop et al.

[11] 4,180,306

[45] Dec. 25, 1979

[54] METHOD OF AND DEVICE FOR SCANNING THERMOGRAPHIC PICTURES

[75] Inventors: Jens Dührkoop, Neckargemund; Günter Pusch, Neckargemund-Dilsberg, both of Fed. Rep. of Germany

[73] Assignee: Industrie Automation GmbH & Co., Heidelberg, Fed. Rep. of Germany

[21] Appl. No.: 712,788

[22] Filed: Aug. 9, 1976 (Under 37 CFR 1.47)

[30] Foreign Application Priority Data

Aug. 8, 1975 [DE] Fed. Rep. of Germany ....... 2535394

[51] Int. Cl.$^2$ .............................................. G02B 27/17
[52] U.S. Cl. ...................................... 350/6.4; 358/199
[58] Field of Search ............... 350/6, 7, 285; 358/199; 355/8, 6; 250/236

[56] References Cited

U.S. PATENT DOCUMENTS

| | | | |
|---|---|---|---|
| 2,967,246 | 1/1961 | Ostergren | 250/236 |
| 3,253,498 | 5/1966 | Lindberg et al. | 350/6 |
| 3,891,299 | 6/1975 | Rushing | 350/6 |
| 3,977,760 | 8/1976 | Velstig | 350/6 |

OTHER PUBLICATIONS

Rutter, Spiral Disc Scanner, 9-1962, IBM Technical Disclosure Bulletin, vol. 5, No. 4 Sep. 1962, p. 57.

Primary Examiner—John K. Corbin
Assistant Examiner—B. W. de los Reyes
Attorney, Agent, or Firm—Becker and Becker, Inc.

[57] ABSTRACT

A method of and device for scanning thermographic pictures according to which an oscillating or rotary movement of an optical element of an optical system of a scanning device serves for scanning in a first direction, e.g., in the horizontal direction, and according to which the scanning movement in a second direction is effected perpendicular to the first direction by changing the position of the axis about which the oscillating or rotary movement was effected for scanning in the first direction.

8 Claims, 4 Drawing Figures

METHOD OF AND DEVICE FOR SCANNING THERMOGRAPHIC PICTURES

The present invention relates to a method of and device for scanning thermographic pictures. Various methods for scanning thermographic pictures have become known. The most frequently employed method consists in scanning the pictures line for line, for instance horizontally, by means of a pivotable mirror or by means of a rotatable polygonal prism, while the transition from one line to the next line is effected by the tilting movement of a deviating mirror introduced into the path of the beams.

This method has the drawback that between each two lines a space remains free which is not scanned. Since each line is scanned individually, the scanning of the entire picture requires a considerable time.

It has furthermore become known to provide a plurality of detectors one above the other and by means of these detectors to simultaneously scan a plurality of lines with one movement of the scanning device. Such an arrangement, however, requires additional technical means. Furthermore, it is unavoidable that between one group of lines scanned simultaneously and the next group of lines there will result a larger distance than between the lines of one and the same group.

According to another heretofore known method, the scanning beam is likewise moved along a straight line, while simultaneously the entire optical system, including the scanning prism and the drive motor therefor, is subjected to a rotating movement. With this device, the scanning is effected along spiral paths while the distances between adjacent spiral lines are all the shorter the lower the speed of the line scanning movement relative to the speed of rotation of the entire device. The construction of this kind of device is very complicated and therefore liable to disorders. Moreover, the device is so heavy that it can be built-in only as a stationary device, for instance, on ships.

It is, therefore, an object of the present invention to provide a method of scanning thermographic pictures which will make it possible in a simple manner to obtain a precise thermographic picture of a sighted object.

It is a further object of the present invention to provide a device of relatively light weight for carrying out the method set forth in the preceding paragraph, while the device is practically free from disorders.

These and other objects and advantages of the invention will appear more clearly from the following specification in connection with the accompanying drawings, in which.

Figure 1:
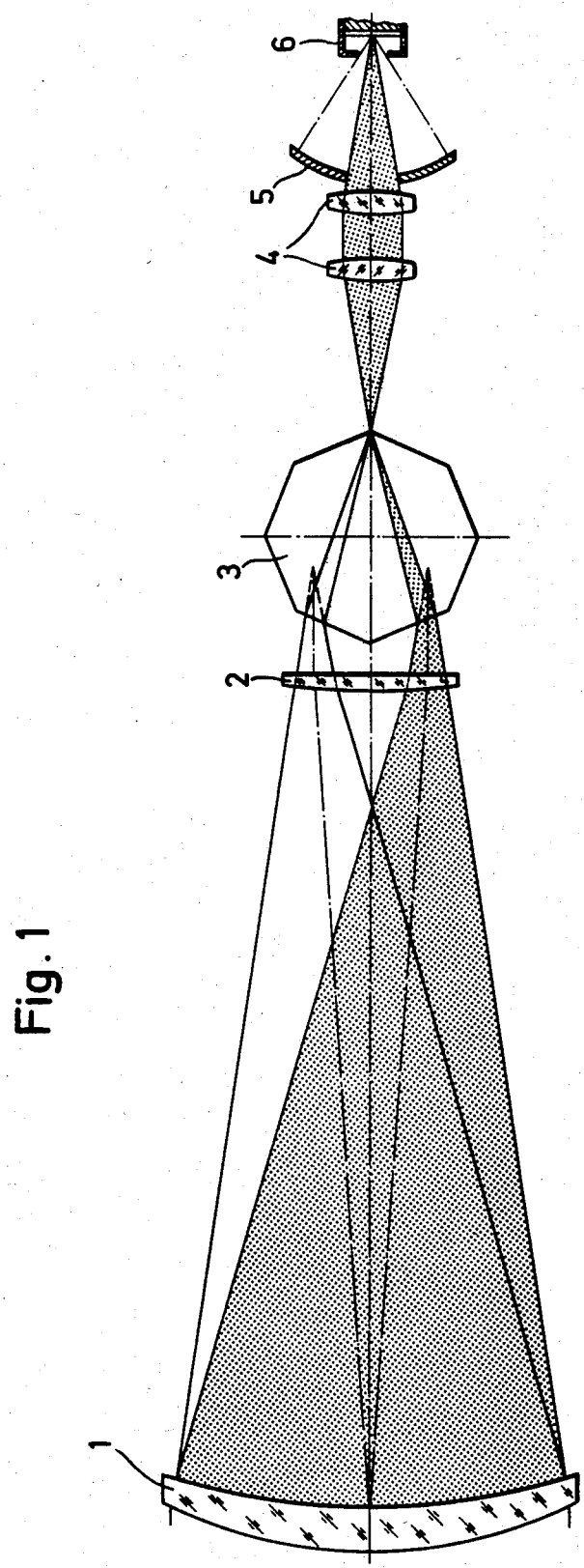
FIG. 1 shows the path of the beams of the recording part of the device according to the invention.
Figure 2:
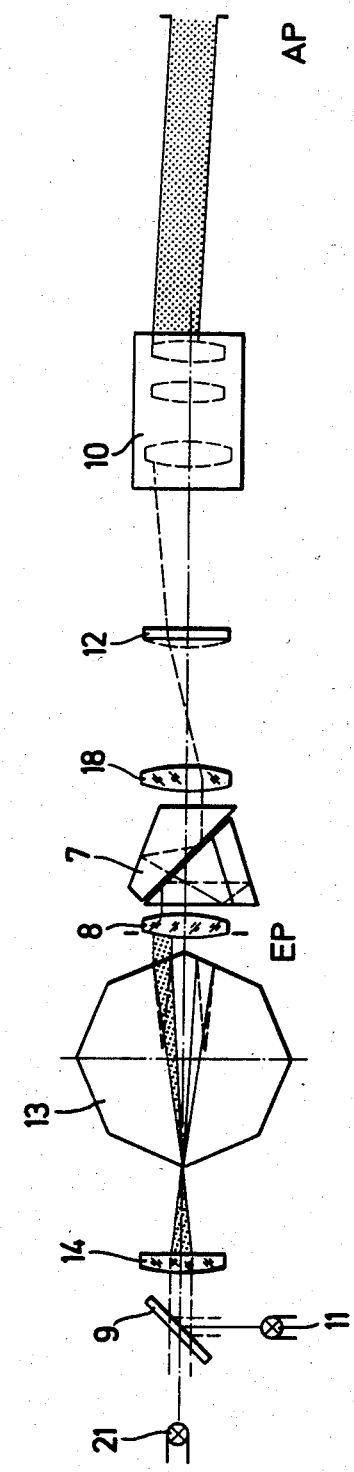
FIG. 2 shows the path of the beams of the reproduction part of the device according to the invention.

With the method according to the present invention for scanning thermographic pictures, according to which an oscillating or turning movement serves for scanning in one direction, for instance in the horizontal direction, the scanning movement in the direction precisely perpendicular to the first direction is effected by changing the position of the oscillating or turning axis.

The two scanning movements are in this instance carried out completely independently of each other. The frequencies of the two scanning movements may in any desired manner be tuned to each other depending on whether a coarser or finer scanning pattern is desired. The directions of the two scanning movements do not have to be perpendicular to each other under all circumstances. It is also possible that they define an acute or obtuse angle with each other. However, a right angle of both directions is the most favorable one.

The practicing of the invention is particularly simple when the horizontal scanning is effected by a rotating polygonal prism and when the vertical scanning is effected by a tilting movement of the axis of the prism. The rotary movement of the polygonal prism does not produce any additional forces which could affect the tilting movement of the axis of the prism. Since furthermore a rotary unit can be made rather light, the masses to be moved during the tilting movement of the axis will be small which fact has a favorable influence upon the possible magnitude of the frequency of the tilting movements, on the mounting of the parts to be tilted, and on the effective driving forces.

The tilting movement may be effected in various ways. Thus, the tilting movement may be controlled by a mechanical transmission, for instance by an Archimedes' spiral as eccentric. The method will be improved and simplified when the axis of the polygonal prism is deviated from its normal zero position by an additional force, for instance by electromagnetic forces, and by a spring force is returned to its zero position.

In such an instance, a high frequency of the tilting movements can be realized. The higher the frequency of the tilting movements with regard to the picture scanning frequency is selected, the finer will be the scanning of the picture and the preciser will be the picture. In order to obtain a reasonably useful picture, the frequency of the tilting movements should at least equal the picture scanning frequency.

The normal time-stroke diagram of an oscillating movement is reproduced by a sine line. This is also true for a free oscillating tilting movement. In this connection, at the reversing points of the oscillating movement dead time periods will occur which increase the distance between two adjacent scanning lines. This drawback can by a further feature of the present invention be eliminated by stopping the tilting movement of the axis of the polygonal prism by means of stops just shortly prior to the reversing point being reached. In this way it is possible to obtain an approximately triangular configuration of the time-stroke curve.

An oscillating system requires the least driving force if it is moved in synchronism with its natural frequencies. In order to realize this, according to a further feature of the invention, the exciter voltage for generating the electromagnetic forces is derived from the tilting movement of the prism.

Sometimes it is required to change the picture scanning frequency in order to adapt the scanning operation to certain given circumstances. Accordingly, the adaptation of the picture scanning frequency is effected electromagnetically.

Also for the reproduction of recorded pictures, the method according to the present invention may be used. By a combination of the two methods, a precise synchronism of the scanning movement can be obtained.

The method according to the present invention can be practiced in various ways. According to a further feature of the invention, with an optical system which is arranged in a housing and which is equipped with a rotating polygonal prism as scanning device, the polygonal prism with the drive motor is mounted in a holding means or device which is provided with a lateral opening for the passage of the beams. The holding device itself is suspended in the housing and is pivotable about an axis which extends perpendicularly to and intersects the axis of rotation of the prism. The holding device is furthermore equipped with a drive which brings about a lateral pivoting of the holding device about the pivot axis.

This design makes it possible to combine with each other two scanning movements which occur independently of and perpendicular to each other, whereby a nearly gap-free picture of the observed object can be obtained.

The rotary movement of the polygonal prism generates a scanning movement which begins at one side of the picture, continues to the other side of the picture and which is repeated line for line in the same manner while due to the tilting movement of the holding device an upwardly and downwardly effective oscillation is produced which occurs perpendicularly to the line scanning.

A further improvement of the device is realized when the holding device which holds the polygonal prism is journalled in torsion springs which, following the tilting movement, return the holding device to its zero position. Due to this design, a rotary pendulum system is created which can oscillate about its central position at high velocity.

Inasmuch as the line scanning movement and the oscillating movement of the holding device occur completely independently of each other, the ratio of the line scanning frequency to the oscillating frequency of the holding device can be selected at will. Particularly favorable conditions are obtained when the oscillating system consisting, on the one hand, of the holding device with polygonal prism and, on the other hand, of the drive motor therefor and the two torsion springs is designed for a resonance frequency which is greater than or equal to half the picture scanning frequency.

With normal oscillation of a free oscillating system, the time-stroke curve follows a sine line. This means that at the start and at the end of each oscillation dead time periods result during which practically no oscillating movement occurs. With the vertical scanning brought about by the oscillations of the holding device, such an arrangement has the drawback that between each two half oscillations, for instance back and forth movement, a dead stripe-like space will be located which will not be hit by the scanning beam. In order to eliminate this defect, shortly prior to the end of the natural oscillating stroke of the holding device, resilient stops are provided which stop the tilting movement of the oscillating masses to such an extent that a nearly linear stroke-time function will be created. The stroke-time curves will no longer follow the shape of a sine line but will be in the form of straight lines which define with each other an acute angle and which extend alternately upwardly and downwardly and thus represent the picture of triangles adjoining each other. The distance from each other and the spring force of the stops are expediently so adjusted that an optimum linear scanning is effected in conformity with the respective format of the object to be scanned. The most favorable setting or adjustment can be obtained by repeated trying. As resilient body, primarily steel springs may be employed. However, also other elastic material, as for instance rubber, may be used for the resilient bodies.

As driving means preferably a coil fixedly arranged on a housing is used which coil together with a permanent magnet mounted on the holding device brings about the deviation of the holding device from its zero position. In order to impart resonance oscillations upon the oscillating system, according to a further feature of the invention, the holding device is provided with two permanent magnets which are respectively located oppositely located coils connected to the housing. The first permanent magnet will in the oppositely located coil induce an induction current which, after having been amplified, is conveyed to the other coil which drives the second permanent magnet precisely in synchronism with the oscillating system. In this way a precise synchronization of the driving forces with the natural frequencies of the system will be realized.

If the device is not intended for recording, but is intended only for reproducing thermographic pictures, the polygonal prism interposed in the path of the beams of the reproduction part can be placed on the shaft of the polygonal prism of the recorder and can be driven by the same drive motor. Such an arrangement greatly simplifies the overall design of the device while simultaneously a complete synchronism of the reproduction part with the recording part will be obtained.

Referring now to the drawings in detail, it may be mentioned that in connection with the illustration in the drawings it is assumed with regard to the two paths of beams that the axis of rotation of the polygonal prism is located at a right angle to the plane of the drawing so that the latter is horizontal.

As will be seen from the drawings, the beams received by the objective 1 pass through the intervention of a field lens or condensing lens 2 to a rotating polygonal prism 3. The location of lens 2 between the polygonal prism 3 and the objective 1 is so selected and its shape is so calculated that the beams broken in the polygonal prism will in each position of the polygon at the point of leaving the polygon meet in one point located on the circumference of the polygon. This brings about that practically no straying occurs at the transition from one polygon surface to the next polygon surface. The divergent beams leaving the polygonal prism are subsequently received by a transformation optic 4 and are converted into a converging beam bundle the tip of which is located in a detector 6. For protecting the detector against the entry of interfering beams, a diaphragm or restrictor 5 is provided. At the reproduction part, the beams emitted by the luminescent diodes 11, 21 are combined in a beam divider 9 so as to form a bundle which through the intervention of a transformation lens 14 is conveyed to a polygonal prism 13. In this instance the lens 14 is so dimensioned that it collects the beams coming from the beam divider 9 in a point which is located on the circumference of the polygon at the entrance of the beams into the polygonal prism. The beams leaving the polygonal prism are received by a lens 8, are conveyed to a Schmidt-prism 7 for turning the picture and through a second lens 18 enter into a field lens 12 which conveys the beams to an ocular 10.

Figure 3:
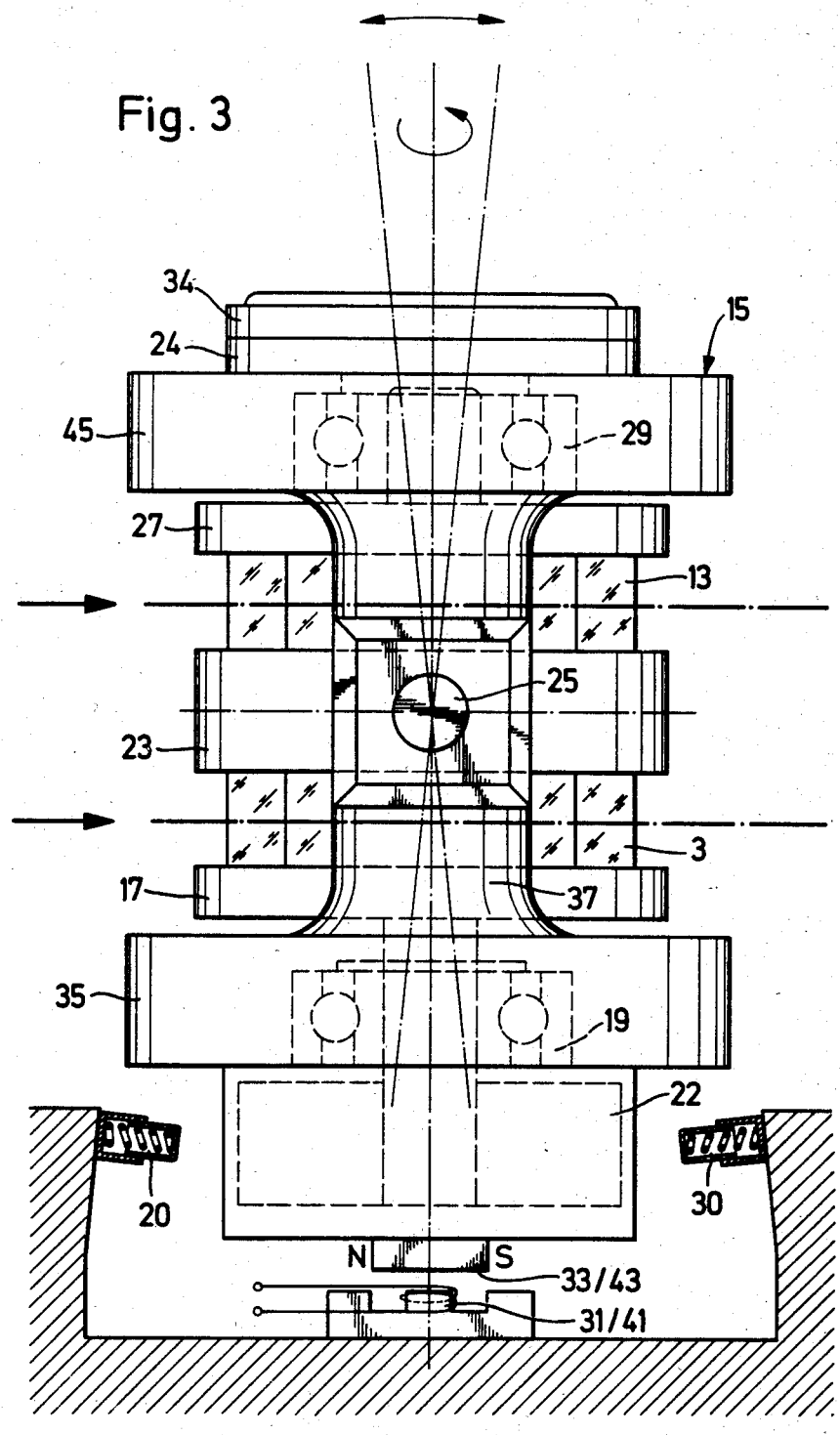
FIG. 3 is a side view, partially in section, of the scanning device according to the invention.
Figure 4:
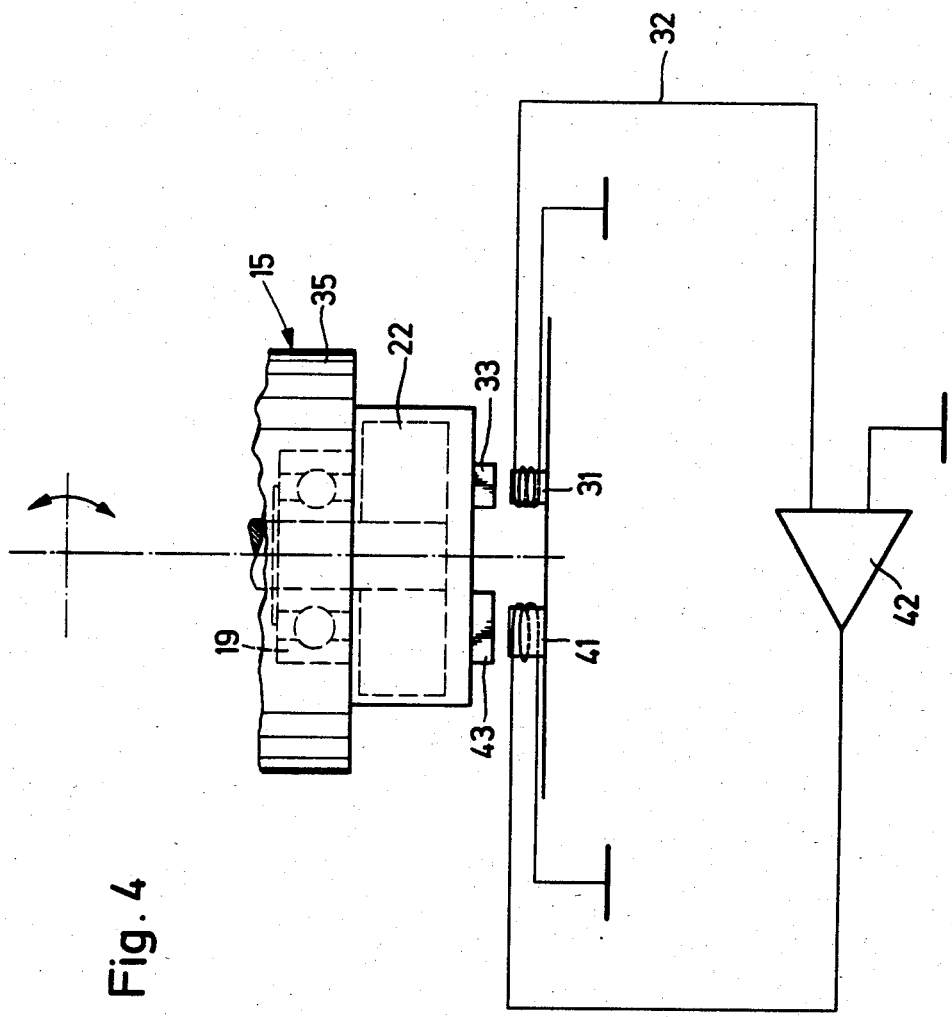
FIG. 4 shows the lower part of the scanning device turned by 90° relative to its position shown in FIG. 3 while also the electrical circuit is being indicated.

The most important element of the new device is the scanning device illustrated in FIGS. 3 and 4, which is by way of example illustrated for a combined device comprising the path of beams for the scanning device as well as the path of beams for the reproducing device.

On a shaft (not illustrated in the drawings) there is mounted a polygonal prism 3 for the scanning path of the beams and a polygonal prism 13 for the reproduction path of the beams. The polygonal prism 3 may, for instance, consist of silicon while the polygonal prism 13 may consist of glass. The prisms are fixed on the drive shaft by means of a separating plate 23 and two end plates, 17, 27. At the lower end of the drive shaft there is mounted a drive motor 22. These elements together form a body of rotation which is journalled at the places 19 and 29 in a holding device 15. The holding device itself forms a frame the open inner part of which is kept free for the passage of the beams. The free space is at the top and at the bottom defined by two plates 35, 45 which receives the bearings 19 and 29 respectively of the body of rotation. These plates 35, 45 are laterally interconnected by strong struts of which only the strut 37 is shown in the drawing. Each of the struts has in its central area a bearing pivot 25 which serves for mounting the holding device in the housing. The bearings may be in customary manner fixedly be built into the housing. In the specific instance shown, it is more favorable to provide a mounting in torsion springs which together with the holding device and the body of rotation mounted therein form an oscillating system. With both designs, the holding device is adapted with the entire body of revolution to carry out oscillating movements about the axis of the pivots 25 while as mass compensation for the motor 22 discs 24, 34 are arranged at opposite ends on the holding device.

The motor housing which is connected to the plate 35 is at its lower wall provided with two permanent magnets 34 and 44. Opposite to each of these magnets, the housing has provided thereon a coil 31 and 41 respectively. Inasmuch as the holding device always carries out small oscillating movements about its horizontal axis, induction currents are generated by the magnet 34 in the coil 31. These induction currents are through conductor 32 conveyed to the driving coil 41. Interposed in the conductor 32 is an amplifier 33 which when turning on the device so amplifies the voltage induced in coil 31 that the coil 41 generates driving forces upon the magnet 44. With the described system, the driving forces occur always precisely in synchronism with the natural oscillations of the holding device whereby the required energy supply is reduced to a minimum.

It is, of course, to be understood that the present invention is, by no means, limited to the specific showing in the drawings but also comprises any modifications within the scope of the appended claims.

What we claim is:

1. A method of scanning thermographic pictures by means of a scanning device comprising a rotating polygonal prism which includes the steps of scanning the respective picture in a first direction by rotating said polygonal prism of the scanning device about its axis of rotation, and scanning said respective picture in a second direction perpendicular to said first direction by oscillating said axis of rotation about an axis extending perpendicular to said axis of rotation and in parallel to the polygon surfaces being momentarily in the beam path when said surfaces have assumed a position in which the optical axis impinges at right angles on said surfaces.

2. A method according to claim 1, which includes the steps of carrying out the scanning in said first direction by selecting as said optical element a polygonal prism and rotating said optical element, and carrying out the scanning operation in said second direction by tilting the prism for said changing the position of the axis of rotation of said optical element.

3. A method according to claim 2, which includes the steps of deviating said optical element out of its normal zero-position for changing the position of the axis of rotation of said optical element during said scanning in said second direction, and subsequently returning said optical element to said zero-position.

4. A method according to claim 2, which includes the step of selecting the frequency of said tilting to effect movements so as to be a value of frequency at least equalling half the picture scanning frequency.

5. A method according to claim 2, which includes the step of stopping said tilting movement of said optical element at a point so that the stroke-time curve of said tilting to effect movement will be in the form of straight lines defining with each other an acute angle and extending alternately upwardly and downwardly so as to represent the picture of triangles adjoining each other.

6. A method according to claim 2, which includes the step of electromagnetically effecting said tilting for movements to effect changing the position of the axis of rotation of said optical element.

7. A method according to claim 6, which includes the step of deriving the drive voltage for generating the electro-magnetic forces for said tilting to effect movements for changing position of the axis of rotation from said tilting movements of said optical element.

8. A method according to claim 1, which includes the step of additionally electronically varying the picture scanning frequency.

* * * * *